FLOATING LATCH

Filed June 28, 1966 2 Sheets-Sheet 1

INVENTOR:
JEFFREY C. KALB
E. Mickey Hubbard
ATTORNEY

FLOATING LATCH

Filed June 28, 1966 2 Sheets-Sheet 2

INVENTOR:
JEFFREY C. KALB

E. Mickey Hubbard
ATTORNEY

United States Patent Office 3,474,263
Patented Oct. 21, 1969

3,474,263

FLOATING LATCH

Jeffrey C. Kalb, Richardson, Tex., assignor to Texas Instruments Incorporated, Dallas, Tex., a corporation of Delaware Filed June 28, 1966, Ser. No. 561,176
Int. Cl. H03k *3/286*
U.S. Cl. 307—289 12 Claims

ABSTRACT OF THE DISCLOSURE

Disclosed in general are binary storage circuits of the type commonly referred to as flip-flops, and specifically improved floating latch steering circuits for operating flip-flops or the like wherein a pair of inverted gates having transistor outputs are utilized, such gates are enabled by a clock pulse through the emitters of the transistors and are cross coupled between the output of one transistor and the input of the other transistor to provide regenerative switching or latching when enabled by the clock pulse. The conductive state or condition of these cross coupled gates are determined by the difference in voltages applied at the inputs of such gates.

This invention relates generally to binary storage means of the type commonly referred to as flip-flops, and more particularly relates to an improved floating latch steering section for operating a flip-flop or the like in accordance with logic input signals.

Many flip-flop circuits have been designed using active semiconductor devices. These circuits are usually comprised of a latch section having two stable states and a steering section for switching the latch section to a state dependent upon input data and, in most cases, upon the state of the latch section at a point in time identified by a clock pulse. The circuits heretofore used have in general been complex, have required a large number of components, and have quite often had temperature stability problems.

This invention is concerned with a floating latch steering section for operating a flip-flop circuit. More specifically, this invention is concerned with a floating latch which recognizes input logic data upon the occurrence of a clock pulse, and then operates a flip-flop or other similar circuit in accordance with the input data. The steering section requires only that the input data be present for a very short period of time before the occurrence of the clock pulse. The steering section is sensitive to differences in the levels of input logic signals so that one or more sets of input logic signals can be given priority over other input logic signals, yet the steering section can perform the more conventional AND, NAND, OR and NOR logic functions. The use of a difference in voltage levels to establish the input data, rather than absolute voltage levels, results in predictable operation over a wide temperature range. The steering circuit further has relatively few active components for the logic functions performed, and draws essentially no current in the absence of a clock pulse. The floating latch has total D.C. operation, and is not affected by the rise and fall time of the clock pulse. The floating latch has the capability of accepting and transferring the logic information almost simultaneously. As a result, the repetition rate of the floating latch is very high and is not a limiting factor in the speed of operation of a flip-flop which uses the floating latch steering section.

These and other objects are accomplished in accordance with the present invention by utilizing a pair of inverting gates having transistor outputs which are enabled by a clock pulse through the emitters, and which are cross-coupled from output to base to provide regenerative switching or latching when enabled by the clock pulse. The state which the cross-coupled gates assume is determined by the difference in voltages applied at the inputs of the respective gates.

More specifically, the floating latch comprises first and second output transistors the emitters of which are common and form the clock input node. The collectors of the transistors form first and second outputs for triggering a flip-flop or the like. The outputs of first and second input logic gate means are connected to drive the bases of the first and second output transistors, respectively. A first regenerative circuit means connects the collector of the first output transistor to an input of the second input gate means, and a second regenerative circuit means connects the collector of the second output transistor to an input of the first input gate means. When a clock pulse arrives at the floating latch, the emitters of the first and second transistors become forward biased, one before the other. The transistor first establishing a forward biased base-emitter junction is turned "on" and the other turned "off" by regenerative switching so that a pulse is produced at that output of the floating latch associated with the transistor which turns "on."

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
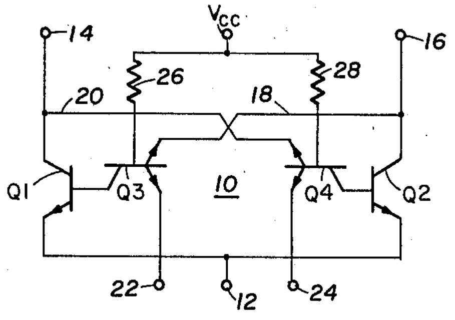
FIGURE 1 is a schematic circuit diagram of a floating latch constructed in accordance with the present invention.

Referring now to the drawings, a floating latch constructed in accordance with the present invention is indicated generally by the reference numeral 10. The floating latch 10 is comprised of a pair of output transistors Q1 and Q2 and a pair of voltage sensitive input logic gate means formed by a pair of multiple emitter transistors Q3 and Q4. The emitters of the output transistors Q1 and Q2 are common and form the clock input node 12. The collector of transistor Q1 forms an output 14, and the collector of transistor Q2 forms an output 16. The collector of transistor Q3, which may be considered as the output of the input logic gate, is connected to drive the base of transistor Q1, and the collector of transistor Q4, which is the output of the other input logic gate, is connected to drive the base of transistor Q2. One emitter of transistor Q3 is connected by a regenerative switching circuit 18 to the collector of transistor Q2, and one emitter of transistor Q4 is connected by a regenerative switching circuit 20 to the collector of transistor Q1. The other emitter of transistor Q3 is connected to a data input 22, and the other emitter of transistor Q4 is connected to a data input 24. The bases of both transistors Q3 and Q4 are continually enabled from the collector supply voltage $V_{cc}$ through resistors 26 and 28, respectively.

In the operation of the floating latch 10, the clock node 12 is normally maintained at a high potential, approaching $V_{cc}$. As a result, neither of the output transistors Q1 or Q2 can conduct, and the output nodes 14 and 16 are also at a high potential. As a result, the emitters of transistors Q3 and Q4, which are connected to the collectors of transistors Q2 and Q1, respectively, are also nonconducting. Input logic levels are applied to inputs 22 and 24, with one of the levels always being less than the other in order to avoid an indeterminate state. The bases of transistors Q3 and Q4 will then assume a potential equal to the lowest potential on one of the emitters plus the base-emitter voltage drop, and the bases of transistors Q1 and Q2 will be held at a voltage equal to the lowest voltage at the data inputs of transistors Q3 and Q4 plus the inherent offset voltage of transistors Q3 and Q4. When the clock node 12 goes to a low level, typically ground potential or slightly above, both transistors Q1 and Q2 will tend to conduct. If input 22 is lower than input 24, however, the base-emitter junction of transistor Q2 will become forward biased, and transistor Q2 will begin conducting before the base-emitter junction of transistor Q1. Then as a result of the regenerative circuit 18, transistor Q3 will provide the necessary drive to keep transistor Q1 "off," finally resulting in a situation in which transistor Q2 is saturated and transistor Q1 is turned "off." As a result, the output 16 will go negative while the output 14 will remain at a positive level until the clock pulse terminates and the clock node again goes positive. On the other hand, when input 24 is more negative than input 22, transistor Q4 will hold the base of transistor Q2 to a lower voltage than that of transistor Q1, the result being that, given a clocking transition, transistor Q1 will become saturated and transistor Q2 will be turned "off." Then the output 14 will go negative while the output 16 remains at a high level.

Figure 2:
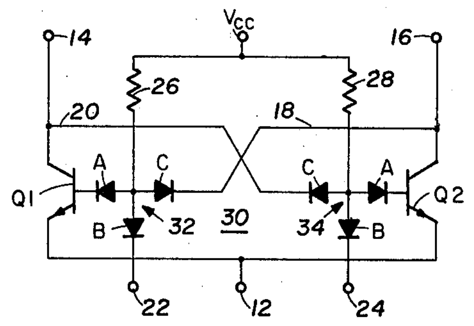
FIGURE 2 is a schematic circuit diagram of another floating latch constructed in accordance with the present invention.

Another floating latch constructed in accordance with the present invention is indicated generally by the reference numeral 30 in FIGURE 2. The floating latch 30 is also comprised of output transistors Q1 and Q2, but the input logic gates are formed by diode noninverting gates 32 and 34, each of which is comprised of diodes A, B and C. The collectors of transistors Q1 and Q2 are again connected to the outputs 14 and 16. Diodes B of gates 32 and 34 are connected to the inputs 22 and 24. Diodes A are connected to the respective bases of transistors Q1 and Q2, and diodes C are connected through the regenerative switching circuits 18 and 20 to the collectors of transistors Q2 and Q1, respectively. The anodes of all of the diodes A, B and C of input gate 32 are connected through resistor 26 to the collector supply voltage $V_{cc}$, and the anodes of diodes A, B and C of input gate 34 are connected through resistor 28 to the collector supply voltage. The clock input node 12 is again connected to the common emitters of transistors Q1 and Q2.

The operation of the floating latch 30 is functionally the same as that of the floating latch 10. So long as the clock input 12 is at a high level, the base-emitters of transistors Q1 and Q2 will be nonconducting so that the outputs 14 and 16 will be at a high voltage level. As a result, diodes C of both gates 32 and 34 will also be nonconducting and both transistors Q1 and Q2 will be enabled to accept data. Assuming that the input 22 is more negative than input 24, the base of transistor Q1 will be more negative than the base of transistor Q2. Then when the clock node 12 goes negative, transistor Q2 will conduct sooner than transistor Q1. This lowers the potential at the base of transistor Q1 as a result of diode C of gate 32, thus tending to turn transistor Q1 further "off" until finally transistor Q1 is turned "off" and transistor Q2 is saturated. On the other hand, if input 24 is more negative than input 22, then on the next clocking transition transistor Q1 becomes saturated and transistor Q2 is turned "off" so that the output 14 will be at a low level and output 16 will be at a high level.

Figure 3:
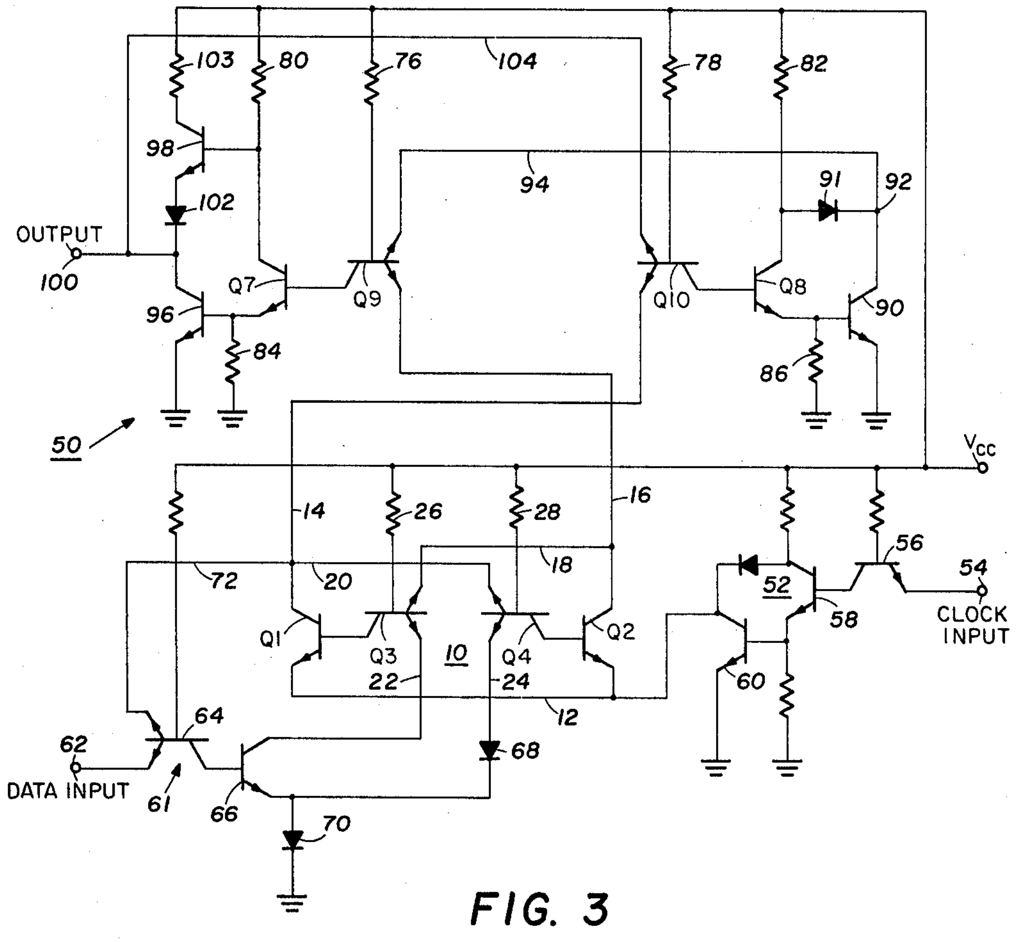
FIGURE 3 is a schematic circuit diagram of a flip-flop using the floating latch of FIGURE 1.

Referring now to FIGURE 3, a flip-flop utilizing the floating latch illustrated in FIGURE 1 is indicated generally by the reference numeral 50. The floating latch section is identical to the floating latch illustrated in FIGURE 1, with corresponding parts designated by corresponding reference characters. Therefore, the description of the floating latch will not be repeated at this time.

The clock input 12 is derived from a buffer circuit indicated generally by the reference numeral 52 which is used to derive the proper threshold level, invert a positive clock pulse, and match the propagation delay of the clock pulse to the propagation delay through the input logic circuit presently to be described. Thus, when a positive pulse is applied to input 54, transistor 56 is turned "off" and transistors 58 and 60 are turned "on," the transistor 60 being saturated. The clock input node 12 is then connected through the saturated transistor 60 to ground. On the other hand, when the clock input 54 is at a low logic level, transistor 56 conducts and transistors 58 and 60 are turned "off." Then the clock input 12 is essentially open circuited and is at a high voltage level.

An input logic circuit indicated generally by the reference numeral 61 has a single data input 62 which is connected to one emitter of a multiple emitter transistor 64. The collector of transistor 64 is connected to drive a transistor 66 between saturation and cutoff. The collector of transistor 66 is connected directly to the data input line 22, and the emitter is connected through diode 70 to ground. The other data input line 24 is connected through diode 68 and diode 70 to ground. The other emitter of transistor 64 is connected to the collector of transistor Q1 by a disabling circuit 72.

When data input 62 is at a high potential corresponding to a logic "1" level and the clock input 12 is at a high level so that output 14 will be at a high level, transistor 64 will be nonconductive and transistor 66 will be switched to saturation. Input 22 will then be at a voltage level corresponding to the collector-emitter voltage drop across saturated transistor 66 plus the drop through the forward biased diode 70, and therefore will be at approximately 1.0 volt. On the other hand, the input 24 will be at a voltage level corresponding to the voltage drop through both diode 68 and diode 70, which will be approximately 1.5 volts. Thus when a logic "1" level is applied to the input 62, transistor Q2 will be turned "on" and transistor Q1 turned "off" when the next clock pulse is applied to the clock input 54.

On the other hand, if the data input 62 is at a logic "0" level, transistor 64 will conduct and transistor 66 will be turned "off." Then input 22 will be at a high potential because transistor 66 constitutes essentially an open circuit, while input 24 will remain at the same voltage level of about 1.5 volts as a result of the voltage drop through diodes 68 and 70. Then transistor Q1 will be turned "on" and transistor Q2 will be turned "off" during the next clock pulse. The disable circuit 72 prevents the output of transistor 64 from changing during the clock pulse in the event the input 62 should go positive after the advent of the clock pulse.

The outputs 14 and 16 are connected to the trigger inputs of a binary storage section or latch section comprised of transistors Q7, Q8, Q9 and Q10. The bases of transistors Q9 and Q10 are connected through resistors 76 and 78 to the collector supply voltage, respectively. The collectors of transistors Q7 and Q8 are connected through resistors 80 and 82 to the collector supply voltage, and the emitters are connected through resistors 84 and 86 to ground. The collectors of transistors Q9 and Q10 drive the bases of transistors Q7 and Q8. The emitter of transistor Q8 drives the base of output transistor 90. The collector of transistor 90 is connected by diode 91 and resistor 82 to the voltage supply and forms an output node 92 which is connected back to an emitter of transistor Q9 by a regenerative switching circuit 94. The emitter of transistor Q7 drives the base of output transistor 96, and the collector drives the base of transistor 98. Transistors 96 and 98 are connected in push-pull configuration to an output 100. The diode 102 establishes D.C. stability at output 100, and the collector of transistor 98 is connected through resistor 103 to the voltage supply. The output 100 is connected by regenerative feedback circuit 104 to the other emitter of transistor Q10.

In the absence of a clock pulse at input 54, transistor 60 is turned "off" and outputs 14 and 16 remain at a high potential because neither transistor Q1 nor Q2 can conduct. If the input 62 is at a logic "0" level, input 22 is more positive than input 24. Then when a positive clock pulse is applied to clock input 54, clock input node 12 goes negative and transistor Q1 will turn "on," thus connecting the emitter of transistor Q10 essentially to ground through transistors 60 and Q2. As transistor Q10 conducts, transistors Q8 and 90 are turned "off" so that output node 92 will approach the collector supply voltage less the drop across diode 91. Since both emitters of transistor Q9 will then be reversed biased, transistor Q7 will be turned "on." This will saturate transistor 96 and turn transistor 98 "off" so that the output 100 will be connected essentially to ground through the saturated transistor 96. At the same time, the other emitter of transistor Q10 will be connected to ground through the regenerative switching circuit 104 and saturated transistor 96 to insure that transistor Q8 remains "off."

On the other hand, if the data input 62 is at a logic "1" level, then transistor 64 will be turned "off" and transistor 66 saturated so that input 24 will be more positive than input 22. Prior to the clock pulse to terminal 54, however, both outputs 14 and 16 will be at a high voltage level so that the state of the binary storage section will not be changed. When a clock pulse occurs, transistor Q2 will be turned "on" and transistor Q1 will remain nonconductive so that transistor Q9 will be turned "on" and transistor Q7 turned "off." As transistor Q7 turns "off," transistor 96 turns "off" and transistor 98 turns "on," and the output 100 is connected to the collector supply voltage through diode 102, saturated transistor 98 and resistor 103. As transistor 98 turns "on" and transistor 96 turns "off," the emitter of transistors Q10 is reverse biased as a result of the regenerative switching circuit 104 so that transistor Q8 is turned "on," thus turning transistor 90 "on" and lowering the output node 92 to ground potential. As a result of the regenerative switching path 94, transistor Q9 is latched "on" so that the output 100 remains at a logic "1" level after the termination of the clock pulse.

Figure 4:
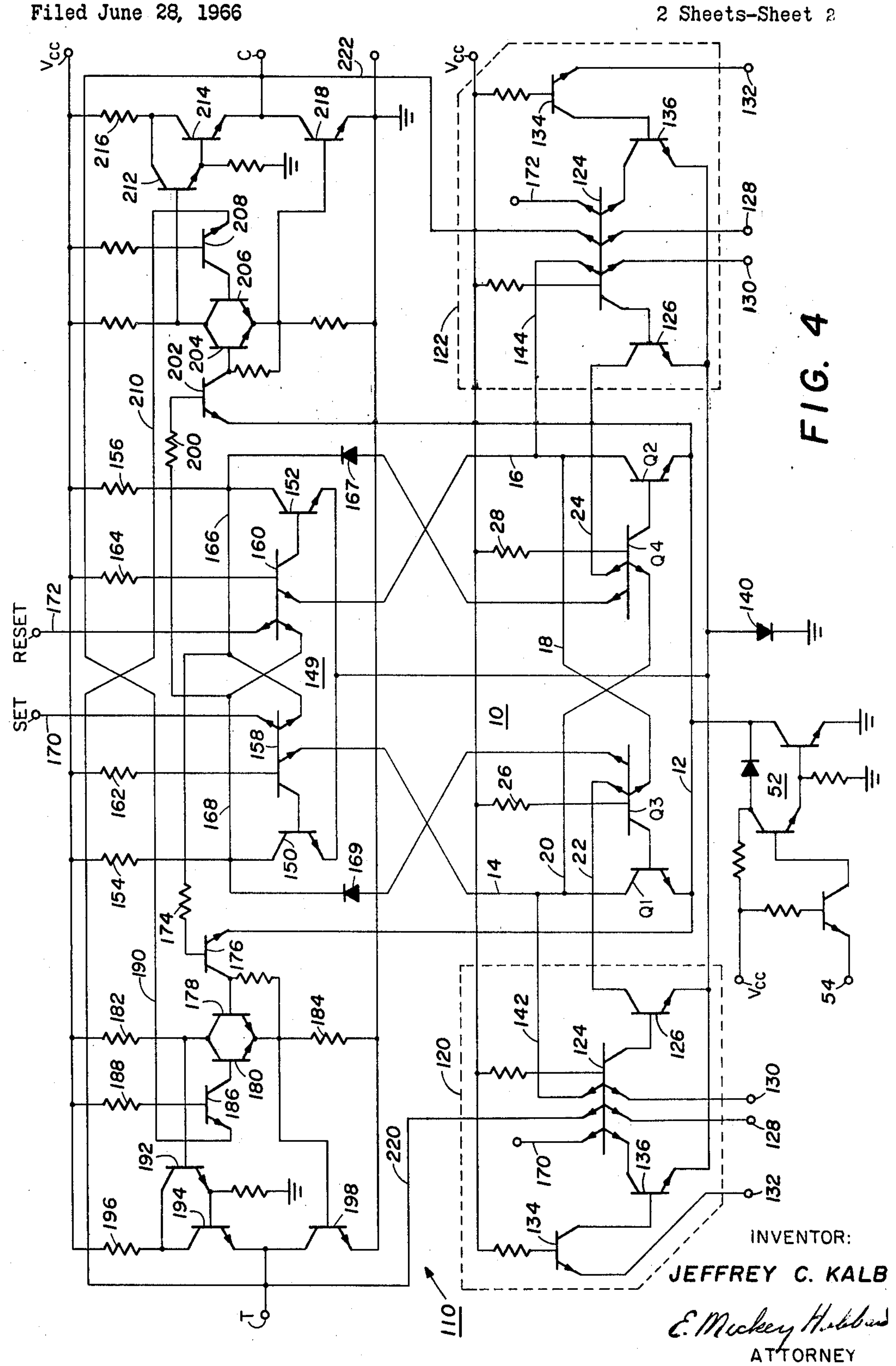
FIGURE 4 is a schematic circuit diagram of a J–K flip-flop constructed in accordance with the present invention.

Referring now to FIGURE 4, another flip-flop utilizing the floating latch of FIGURE 1 is indicated generally by the reference numeral 110. The flip-flop 110 uses the same floating latch illustrated in FIGURE 1 with the exception that transistors Q3 and Q4 have three emitters, rather than two. Accordingly, the various components of the floating latch are designated by the same reference characters and the floating latch will not now be described in detail. The clock node 12 is driven by the inverting buffer 52 heretofore described in FIGURE 3. The inputs 22 and 24 are driven by NAND gates indicated generally by reference numerals 120 and 122. NAND gate 120 is comprised essentially of a multiple emitter transistor 124 which performs an AND function and an output transistor 126 the base of which is driven by transistor 124. The collector of transistor 126 is the output of the gate and is connected to the input 22. Two of the emitters of transistor 124 serve as inputs 128 and 130 of the gate 120. Another inverting input 132 to gate 120 is provided by the emitter of transistor 134. The collector of transistor 134 is connected to drive the base of transistor 136, and the collector of transistor 136 is connected to another emitter of transistor 124. Thus, input 132 is an inverted input because when a logic "0" level is applied to input 132, transistor 134 is turned "on" and transistor 136 is turned "off" so that no current can flow through the emitter of transistor 124. When all emitters of transistor 124 are reverse biased, i.e., at a high voltage level, transistor 126 is turned "on" so that input 22 is connected to ground through diode 140 and the saturation level of transistor 126.

NAND gate 122 is identical to NAND gate 120 and corresponding components are accordingly designated by corresponding reference characters. The collector of output transistor 126 of NAND gate 122 is connected to input 24.

Output 14 is connected back to an emitter of transistor 124 of NAND gate 120 by circuit 142. Similarly, output 16 is connected back to an emitter of transistor 124 by circuit 144.

The flip-flop 110 has a first latching section 149 which is comprised of transistors 150, 152, 158 and 160. The emitters of transistors 150 and 152 are common and are connected to ground through diode 140. The collector of transistor 150 is connected to the voltage supply through resistor 154, and to an emitter of transistor Q3 through diode 169. The collector of transistor 152 is connected to the voltage supply through resistor 156, and to an emitter of transistor Q4 through diode 167. The base of transistor 150 is driven by multiple emitter transistor 158, and the base of transistor 152 is driven by multiple emitter transistor 160. The bases of transistors 158 and 160 are connected through resistors 162 and 164 to the voltage supply. One emitter of transistor 158 is connected to the output 14 of the floating latch steering section 10, and one emitter of transistor 160 is connected to output 16. Another emitter of transistor 158 is connected to the collector of transistor 152 by a regenerative switching or latching circuit 166, and an emitter of transistor 160 is similarly connected to the collector of transistor 150 by a latching circuit 168. Another emitter of transistor 158 is a "Set" input 170, and an emitter of transistor 160 is a "Reset" input 172. Inputs 170 and 172 are normally at a high voltage level so that the corresponding emitters of transistors 158 and 160 will not conduct. Inputs 170 and 172 are also connected to an emitter of transistors 124 of each of the input NAND gates 120 and 122 to disable the gates and therefore the floating latch steering section during "Set" and "Reset."

The collector of transistor 152 is also connected through resistor 174 to drive the base of transistor 176. The emitter of transistor 176 is connected to the clock input node 12 of the floating latch section 10, and the collector is connected to drive the base of transistor 178. Transistor 178 is connected in parallel with transistor 180, and the collectors of the transistors are connected through resistor 182 to the voltage supply and the emitters through resistor 184 to ground. The base of transistor 180 is driven by the collector of transistor 186. The base of transistor 186 is driven from the voltage supply through resistor 188, and the emitter is connected through latching circuit 190 to the complement output C. The collectors of transistors 178 and 180 are connected to drive the base of transistor 192 which is connected in Darlington pair configuration with transistor 194. The collectors of transistors 192 and 194 are connected through resistor 196 to the voltage supply, and the emitter of transistor 194 is connected to the true output T. The emitters of transistors 178 and 180 are connected to drive the base of transistor 198 which when turned "on," connects the true output T to ground.

The collector of transistor 150 is similarly connected through resistor 200 to drive the base of transistor 202. Transistor 202 drives the base of transistor 204 which is connected in parallel with transistor 206. The base of transistor 206 is driven by transistor 208, the emitter of which is connected by latching circuit 210 to the true output T. The collectors of transistors 204 and 206 are connected to drive the base of transistor 212 which is connected in Darlington pair configuration with output transistor 214. When transistor 214 is turned "on," the complement output C is connected through resistor 216 and transistors 212 and 214 to the supply voltage. The emitters of transistors 204 and 206 are connected to drive the base of output transistor 218 which when turned "on," connects the complement output C to ground.

The true output T is connected by a disabling circuit 220 to an emitter of transistor 124 of NAND gate 120, and the complement output C is connected by a similar disabling circuit 222 to an emitter of transistor 124 of NAND gate 122.

In the operation of the flip-flop 110, the input logic data is set up on the input gates 120 and 122, including the feedback from the true and complement outputs T and C of the flip-flop and the feedback from the outputs 14 and 16 of the floating latch section 10. Then on the initial rise of the clock pulse, the floating latch section 10 transfers the logic data at the outputs from the gates 120 and 122 to the first latching section 149. Then on the fall of the clock pulse, the data set into latching section 149 is transferred to the output latching section as a result of the operation of transistors 176 and 202.

For example, assume that the flip-flop is in the logic "0" state so that the true output T is at a logic "0" level and the complement output C is at a logic "1" level. As a result of the feedback from the true output T through circuit 220, transistor 124 must be turned "on" so that gate 120 will be disabled and the output will be at a high voltage level corresponding essentially to an open circuit, regardless of the voltage levels applied to the inputs 128, 130 and 132. On the other hand, the logic "1" feedback from the complement output C through circuit 222 enables the gate 122 so that the output from the gate 122 will be at a logic "1" level, i.e., an open circuit, if any one of the inputs 128 and 130 is at a logic "0" level or if input 132 is at a logic "1" level, or will be at a logic "0' level if inputs 128 and 130 are at a logic "1" level and input 132 is at a logic "0" level. The logic "0" output is a voltage level equal to the voltage drop across transistor 126 when it is saturated plus the voltage drop across the forward biased diode 140.

Immediately after the circuit is energized, assuming the clock input 54 is at a logic "0" level, the state of transistors 150 and 152 will be related to the states of the true and complement outputs T and C of the flip-flop. Thus, for convenience, assume that the flip-flop has been set in operation and that transistor 152 is turned "off" and transistor 150 is turned "on." This corresponds to the logic "0" state of the flip-flop.

Assume first that the output from NAND gate 122 is at a logic "1" level which is essentially an open circuit prior to the clock pulse. The voltages on two of the emitters of transistor Q3 will then be essentially open circuit voltages because transistor 126 of gate 120 is turned "off" (because of the "0" level at the true output T), and both transistors Q2 and Q1 are nonconductive as a result of the reverse bias or high potential at their emitters in the absence of a clock pulse. The other emitter of transistor Q3 will be at a potential equal to the voltage drop across diodes 169 and 140, plus the voltage drop across transistor 150 which is saturated ($2V_{BE}+V_{sat}$). On the other hand, all of the emitters of transistor Q4 will be at a high level corresponding essentially to an open circuit because it was assumed that transistors 126 and 152 are turned "off." Thus, when the clock arises at the input 54 and the clock node 12 falls, transistor Q1 remains "off" while transistor Q2 is turned "on." As a result, transistor 160 is turned "on." Since transistor 152 is already "off," no change in the status of latching section 149 occurs. During the clock pulse, the emitters of transistors 176 and 202 are at essentially ground potential so that neither transistor 178 nor 204 can be turned "on." Since no change was made in the status of latching section 149, the status of the true and complement outputs T and C does not change when the clock pulse falls.

Now assume that the requirements on inputs 128, 130 and 132 of NAND gate 122 are satisfied and transistor 126 is turned "on" so that the output of the NAND gate is a logic "0" level equal to the voltage drop across saturated transistor 126 plus the voltage drop across diode 140. It is important to note that the data input 24 is therefore at essentially 1.0 volt while the emitter of transistor Q3 that is connected through diode 169, saturated transistor 150 and diode 140 is at approximately 1.5 volts. Then on the leading edge of the clock pulse when the clock node 12 goes negative, transistor Q1 will be turned "on" and transistor Q2 will remain "off" because an emitter of transistor Q4 is at a voltage lower than the minimum voltage on an emitter of transistor Q3. As a result, output 14 will go negative and transistor 158 will be turned "on," thus turning transistor 150 "off." The operation of the latching circuits will then turn transistor 152 "on."

During the clock pulse, the emitters of transistors 176 and 202 will again be at a low level so that neither of the data transfer transistors 178 nor 204 can be turned "on." However, when the trailing edge of the clock pulse occurs so that the clock node 12 again goes to a high voltage level, the high voltage level at the collector of transistor 150 will be transferred through the forward biased diode formed by the base and collector of transistor 202 to turn transistor 204 "on." This in turn turns transistors 212 and 214 "off" and transistor 218 "on" so that the complement output C is then connected to ground and is at a logic "0" level. As the complement output C goes to a logic "0" level, transistor 186 is turned "on" as a result of the latching circuit 190 so that transistor 180 is turned "off." Transistor 178 is also turned "off" because the base of transistor 176 is at a logic "0" level as a result of the circuit through resistor 174 to the collector of transistor 152 which is "on." Thus, transistors 192 and 194 are turned "on" and transistor 198 is turned "off" so that the true output goes to a logic "1" level.

Input NAND gate 120 is now enabled and input NAND gate 122 disabled as a result of the feedback from the true and complement outputs T and C, respectively. The flip-flop 110 will remain in this state until all inputs of NAND gate 120 are satisfied. Then on the leading edge of the next clock pulse, the secondary latch 149 will be switched, and the true and complement outputs T and C will be switched on the trailing edge.

In the flip-flop 50, a single data input 62 was used, and input 24 to the floating latch 10 was maintained at a constant voltage of about 1.4 volts as a result of the voltage drop through the two diodes 68 and 70. Operation of the floating latch and therefore of the flip-flop was controlled by changing the input 22 from a voltage of approximately 1.0 volt, when transistor 66 was saturated as a result of a logic "1" at input 62, to an open circuit when transistor 66 was turned "off" by a logic "0" on input 62. In the flip-flop 110, on the other hand, the inputs 22 and 24 may each either be a high voltage level corresponding to an open circuit, or a low voltage level corresponding approximately to 1.0 volt as a result of the voltage drop across saturated transistor 126 of the gates and diode 140. Thus, if the inputs to either NAND gate 120 or gate 122 is not satisfied, both inputs 22 and 24 would be at a high voltage level corresponding to an open circuit and the state of the floating latch section 10 upon the occurrence of a clock pulse would be indeterminate. Under these conditions the feedback provided by diodes 167 and 169 assures that the floating latch section 10 will latch up in the same state as the secondary latching section 149 to insure that the outputs T and C of the flip-flop do not change and therefore eliminate the indeterminate condition. Since the voltage level applied to the data inputs 22 and 24 when one of the transistors 126 is saturated is less (1.0 volt) than the voltage level resulting from the circuit through one of the feedback diodes 167 and 169 and diode 140 (1.5 volts), the input data overrides the feedback data to achieve switching of the flip-flop at the proper time.

It will be noted that the floating latch 10 permits the assignment of priorities to data applied to the input emitters of transistors Q3 and Q4 without any additional components. It is also to be pointed out that a large number of priority levels can be established if desired in the operation of the floating latch section 10 merely by increasing the number of emitters of the transistors Q3 and Q4. This capability provides an added dimension in logic control not heretofore readily attainable. These various logic levels can be achieved using diode junctions, transistors, voltage divider networks or other suitable means.

From the above detailed description of preferred embodiments of the invention, it will be noted that a new and highly useful device has been described. The floating latch section is dependent only upon the relative voltage levels at the inputs, rather than the absolute voltage levels, and therefore its operation is predictable over a relatively wide temperature range because only the relative values of the input voltage need be maintained. It will also be noted that the circuits employ no capacitors or other A.C. coupling means and therefore are ideally suited for fabrication as integrated circuits on a single substrate. Integrated circuits utilizing the floating latch have been successfully operated at temperatures as high as 200° C. Further, an unusually small number of active components is required in order to achieve relatively complex logic functions. Another very important advantage of the latching circuit is its speed of operation. Since the latching circuit is floating, i.e., is not latched up until the arrival of the clock pulse, no active components need be switched upon the arrival of the logic data before the flip-flop can be switched. Instead, the logic levels need merely be present at the data inputs 22 and 24 before the occurrence of the clock pulse. Since the input data in the form of logic levels propagates through the input NAND gates 120 and 122 in the flip-flop 110, or through the gate comprised of transistors 64 and 66 in flip-flop 50, while the clock pulse is propagating through a substantially identical inverter circuit 52, the clock pulse may follow very closely behind the input logic levels. Further, the operation of the floating latch and therefore of the flip-flops driven by the floating latch is not dependent upon the rise and fall times of the clock pulse for operation. These factors contribute to an integrated circuit, D.C. coupled flip-flop having a high repetition rate, yet having wide logic capability, including the new capability to assign priorities to various input data.

Although preferred embodiments of the invention have been described in detail, it is to be understood that various changes, substitutions and alterations can be made therein without departing from the spirit and scope of the invention.

What is claimed is:

1. In a binary storage circuit, a steering section comprising the combination of first and second output transistors of one type the emitters of which are common and form a clock input node, and the collectors of which form first and second outputs, respectively, first and second input transistors of the opposite type each having a plurality of emitters, the bases of the first and second input transistors being connectable to a voltage supply, the collectors being connected to the bases of the first and second output transistors, respectively, the collector of the first output transistor being connected to an emitter of the second input transistor, the collector of the second output transistor being connected to an emitter of a first input transistor, and the other emitters of the first and second input transistors being the logic inputs to the floating latch circuit.

2. The combination defined in claim 1 further characterized by:

a flip-flop circuit having first and second trigger inputs connected to the first and second outputs of the steering section, and data input circuit means connected to the logic input emitters of the first and second input transistors for selectively, in response to input data, causing the logic input emitters of one input transistor to be at a different potential than the logic input emitters of the other input transistor.

3. The combination defined in claim 2 further characterized by:

clock input circuit means connected to apply clock pulses to the clock input node in response to a clock pulse, the clock input circuit means having a propagation delay corresponding to the propagation delay through the data input circuit means whereby the clock pulse may follow closely behind the input data.

4. The combination defined in claim 1 further characterized by first and second input gate means each having a plurality of inputs and an output, the output of the first input gate means being connected to a logic input of the first logic gate means and the output of the second input gate means being connected to a logic input of the second logic gate means.

5. The combination defined in claim 4 further characterized by a flip-flop circuit having first and second trigger inputs connected to the first and second outputs of the steering section, and true and complement outputs connected back to inputs of the first and second input gate means for disabling the respective input gate means and thereby eliminating an indeterminate condition.

6. The combination defined in claim 4 further characterized by first circuit means connecting the first output to an input of the first input gate means for disabling the first input gate means when the first output produces an output signal, and second circuit means connecting the second output to an input of the second input gate means for disabling the second gate means when the second output produces an output signal.

7. The combination defined in claim 1 further characterized by a flip-flop circuit having a latching section with first and second inputs connected to the first and second outputs of the steering section, respectively, and first and second inverted outputs, the first inverted output being connected back to a logic input emitter of the first input transistor and the second inverted output being connected back to a logic input emitter of the second input transistor.

8. The combination defined in claim 7 wherein the outputs of the latching section have output voltage levels greater than the input voltage levels to the other emitters of he first and second input transistor means whereby the input voltage levels will take precedence over the output voltage levels fed back from the outputs of the latching section.

9. The combination defined in claim 4 wherein the first output is connected back to an input of the first gate means and the second output is connected back to an input of the second gate means whereby the gate means will be disabled from changing the state of the floating latch as a result of a change in the logic input levels to the gate means during the clock pulse.

10. A floating latch circuit comprising in combination:

(a) first and second data inputs, a clock input and first and second latch circuit outputs;

(b) first and second output transistors, each having emitter, collector and base electrodes, with said emitter electrode of each coupled to said clock input and said collector electrode of each respectively coupled to said first and second latch circuit outputs;

(c) first and second input logic gate means, each having an output and first and second inputs, with said gate output of each respectively coupled to said base electrodes of said output transistors and said first gate input of each respectively coupled to said data inputs;

(d) a first regenerative switching circuit coupling said first latch circuit output to said second gate input of said second input logic gate means; and (e) a second regenerative switching circuit coupling said second latch circuit output to said second gate input of said first input logic gate means.

11. The floating latch circuit of claim 10 wherein (a) each of said first and second input logic gate means is a multiple emitter transistor having collector, base, and two emitter electrodes; and wherein (b) the collector electrode of each of said multiple emitter transistors is said gate output; and wherein (c) the emitter electrodes of each of said multiple emitter transistors are respectively said first and second gate inputs; and wherein (d) the base electrode of each of said multiple emitter transistors is connected to a voltage supply.

12. The floating latch circuit of claim 10 wherein:

(a) said first and second input logic gate means are respectively first and second groups of at least three diodes, with the anodes of said diodes in each group being connected in common and connected to a voltage supply; and wherein (b) the cathode of a first diode in each group is said gate output; and wherein (c) the cathode of a second diode in each group is said first gate input; and wherein (d) the cathode of a third diode in each group is said second gate input.

References Cited

UNITED STATES PATENTS 3,247,399 4/1966 Moody -------- 307—269 XR

DONALD D. FORRER, Primary Examiner

STANLEY T. KRAWCZEWICZ, Assistant Examiner

U.S. Cl. X.R.

307—208, 269